Figure 1:
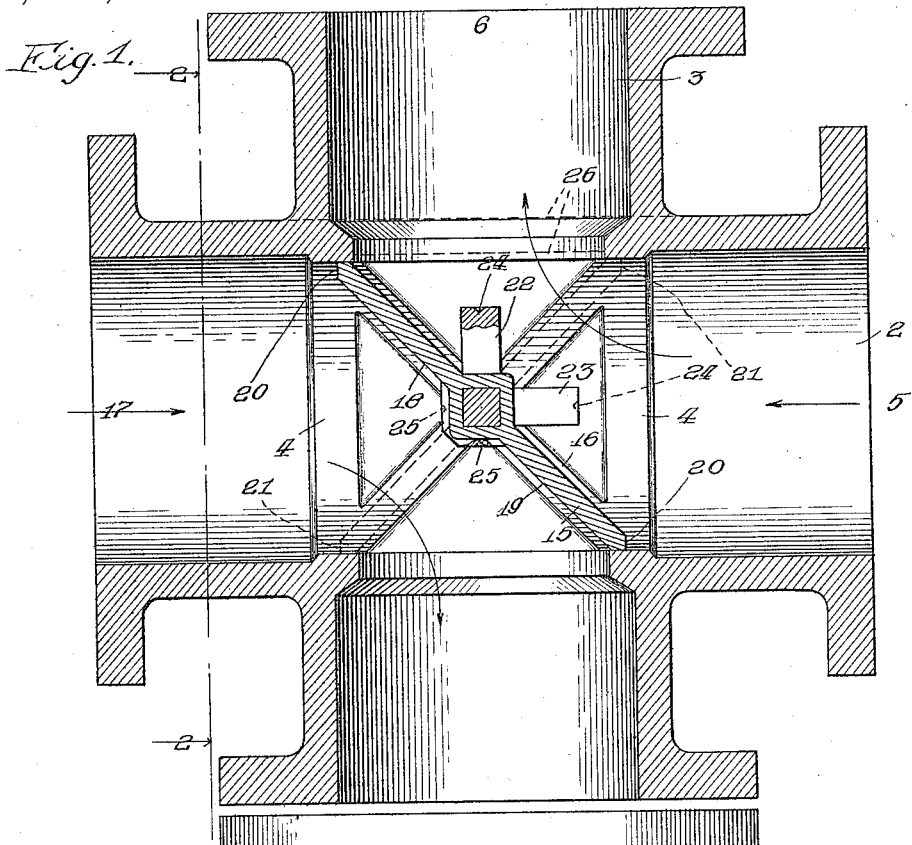
Figure 2:
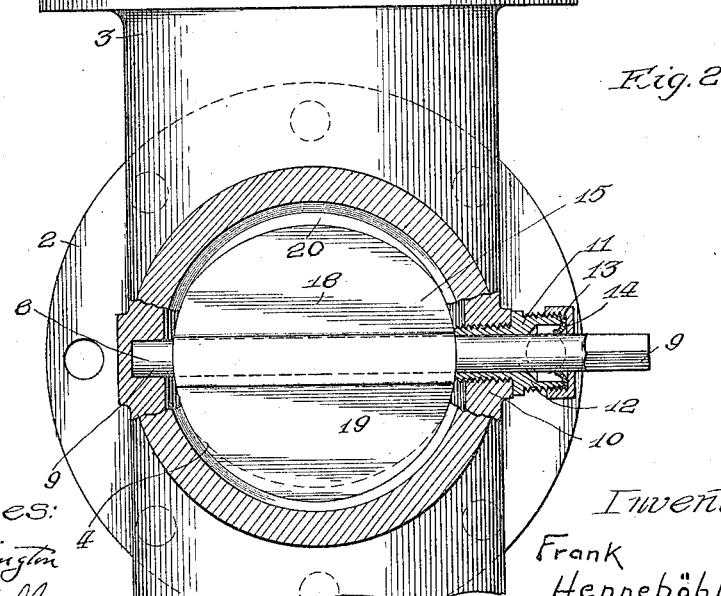

F. HENNEBÖHLE.
BUTTERFLY VALVE.
APPLICATION FILED JUNE 18, 1914.

1,152,176.

Patented Aug. 31, 1915.

Witnesses:

Inventor
Frank Henneböhle
By Lotz & Scheibl Atty.

UNITED STATES PATENT OFFICE.

FRANK HENNEBÖHLE, OF CHICAGO, ILLINOIS.

BUTTERFLY-VALVE.

1,152,176.  Specification of Letters Patent.  Patented Aug. 31, 1915.

Application filed June 18, 1914. Serial No. 845,808.

*To all whom it may concern:*

Be it known that I, FRANK HENNEBÖHLE, citizen of the United States, residing at Chicago, in the county of Cook and State of Illinois, have invented certain new and useful Improvements in Butterfly-Valves; and I do hereby declare the following to be a full, clear, and exact description of the invention, such as will enable others skilled in the art to which it appertains to make and use the same.

My invention relates to butterfly valves; that is to say, valves in which a single movable vane controls the connection from one entrance passage to either one of two exit passages, or interchangeably from either of two entrance passages to either of two exit passages.

The general objects of my invention are to provide a simple, cheaply made and easily assembled valve in which an effective closure between the body and vane members may be effected without the use of auxiliary packings when the vane is in either of its normal operative positions; to provide simple means for machining the seat portions of the valve body with a minimum of labor; to provide simple means for accurately machining the peripheral portions of the vane to the configuration required for an effective seating of the said vane when in either of its operative positions; and to provide a vane which will be effectively maintained in either of its normal operative positions by the pressure of the fluid passing from the entrance to the exit passage of the valve.

Further objects will be apparent from the following specification, and from the drawings, in which—

Figure —1— is a section through a four-way valve embodying my invention. Fig. —2— is a transverse section through Fig. —1— along the line 2—2.

In Fig. —1—, my invention is shown as embodied in a valve having a body 1 in the shape of a cross presenting bores 2 and 3 disposed at right angles to each other. One of the said bores, namely bore 2 of the drawings, is equipped substantially tangentially of the intersecting bore 3 with annular rings 4 cast integral with the body 1 and affording contractions, which contractions are bored out to form bores of a common cylindrical surface centered about the axis 5 of the said bore 2. Extending through the intersection between the axis 5 of the bore 2 and the axis 6 of the cylindrical bore 3 and at right angles to both of said axes is the axis of a shaft 7 comprising a square shank equipped at one end with a cylindrical tip 8 and at its other end with a tapered angular portion 9 adapted to receive a suitable handle. The body 1 is equipped on one side with a cylindrical socket formation 9 adapted to form a bearing for the end 8 of the shaft and on its opposite side with a threaded boss 10 adapted to receive a bushing 11 carrying a packing box 12. The latter preferably consists of a threaded portion equipped with a cap 13 and a gasket 14 of leather or other suitable material interposed between the box 11 and the cover 13, the said gasket being preferably so shaped as to be flared toward the inner end of the bushing 11 and into contact with a cylindrical portion of the shaft 7 interposed between the square shank of the latter and the handle-receiving end 9 thereof. Mounted upon the said shaft is a valve member 15 having a bore of square section adapted to receive the said shank of the shaft and to be kept from rotating with respect to the shaft by the said square configuration of the shaft and the bore of the vane. The vane or movable valve member 15 consists essentially of a metal disk of substantially elliptical outline, being peripherally bounded by the cylindrical surface of which the contractions 4 form portions and by another cylindrical surface of equal diameter to the aforesaid cylindrical surface but centered about the axis 6; that is to say, the peripheral portions of the vane form surface bands comprising parts of equi-diametered cylindrical surfaces formed about axes intersecting at angles equal to the angles between the axes of the intersecting bores of the valve body. The said valve body is also equipped with a second pair of contractions 16 disposed substantially along planes diagonally of the axes of both bores or in alinement with the direction in which the vane is disposed when in either of its operative positions, each of the said contractions 16 being somewhat wider than the thickness of the vane 15. The said diagonally disposed contractions or inwardly projecting rings 16 are bored simultaneously with the aforesaid contraction rings 4, so that they also form portions of the same cylindrical surface which bounds the portion of the periphery of the vane 15 when the latter is in the position shown in Fig. —1—.

It will be evident from Fig. —1— that since both the contraction rings and the adjacent portions of the periphery of the vane form parts of the same cylindrical surface, they will afford a substantially tight closure; and that if the vane is moved to its other operative position, as shown in dotted lines, the similar curvature of the faces then engaging the contractions or seat portions of the body will likewise insure a good seating of the movable valve member. Moreover, it will be evident from Fig. —1— that with pressure exerted by fluid passing through the valve, as shown by the arrows 17, the said pressure will bear upon equal lengths of vane faces 18 and 19, thereby tending respectively to rotate the vane in opposite directions. However, the said pressure will also be exerted on the peripheral vane portions 20 disposed substantially at right angles to the direction in which the fluid enters the valve and acting upon a portion of the vane affording a maximum of leverage to the said pressure. Consequently, the pressure upon the said portion 20 will tend to rotate the vane in a clockwise direction, thereby maintaining the same firmly seated in the position shown in Fig. —1—. Likewise when the vane is in the position shown in dotted lines, the pressure exerted upon the peripheral face portion 21 will tend to rotate the valve in a counter-clockwise direction, thereby maintaining the vane in the other of its operative positions.

To simplify the manufacturing of the vane so as to insure an easy and cheap machining of the peripheral portions thereof, I preferably equip the vane with a pair of studs 22 and 23 alining respectively with the axes 5 and 6 of the bores when the vane is in either of its operative positions. Each of the said studs is equipped at its free end with a conical depression 24 and the vane is likewise provided upon its opposite side with conical depressions 25 in axial alinement with the axes of the said studs, so that the said depressions may be used in centering the vane in either of two positions upon a lathe, while the lugs 22 may be gripped by a suitable lathe dog for rotating the vane about the axis of the corresponding lug. Consequently, the peripheral portions of the vane may easily be machined in an ordinary lathe to correspond to the respective cylindrical surfaces required for their proper configuration.

It will be obvious that the mounting and packing of the valve stem or shaft may be accomplished in many different ways, but I preferably provide an inwardly flexible flared washer 14, shown in Fig. —2—, so that any leakage of fluid into the stuffing box 12 will tend to force the said washer against the adjacent portion of the shaft, thereby affording a packing which will automatically adjust itself to the required degree of tightness. It will also be evident that the arrangement of my invention could be used with equal facility with a three-way valve, as indicated by the dotted lines 26, in Fig. —1—, and that the various details of construction herein disclosed might be varied in many ways without departing from the spirit of my invention.

I claim as my invention:—

1. A butterfly valve comprising a body member having a pair of intersecting cylindrical bores, a shaft extending substantially through the center of the said intersecting bores, and a vane carried by the shaft and adapted normally to be disposed in either of two positions each oblique with respect to both of said intersecting bores: one of the said bores equipped with a pair of annular contractions disposed at right angles to its axis, and also equipped with a pair of contractions disposed diagonally of the said axis and intersecting at the axis of the said shaft, all of the said contractions presenting inner surfaces in cylindrical alinement with each other: the vane when in each of its said positions being laterally contiguous to one of said diagonal contractions and bearing at its ends respectively against the two annular contractions.

2. A butterfly valve comprising a body member having a pair of bores disposed about intersecting axes, a shaft extending through the intersection of said bores, a substantially flat vane carried by the shaft and peripherally bounded by portions of equi-diametered cylindrical surfaces centered about the said axes, and means associated with said vane and disposed respectively axially of the said axes for enabling said vane to be supported respectively axially of either of said axes while machining the said peripheral portions of the vane.

3. A butterfly valve comprising a body member having a pair of bores disposed about intersecting axes, a shaft extending through the intersection of said bores, a substantially flat vane carried by the shaft and peripherally bounded by portions of equidiametered cylindrical surfaces centered about the said axes, and a pair of centering studs carried by the said vane respectively axially of the said axes.

In testimony whereof I have signed my name in presence of two subscribing witnesses.

FRANK HENNEBÖHLE.

Witnesses:
M. M. BOYLE,
G. M. NEVILLE.

Copies of this patent may be obtained for five cents each, by addressing the "Commissioner of Patents, Washington, D. C."